United States Patent
Mikkelson (10) Patent No.: US 7,156,323 B2
(45) Date of Patent: Jan. 2, 2007

(54) PORTABLE SPRAY RACK

(75) Inventor: Todd Mikkelson, Mound, MN (US)

(73) Assignee: The RM Group LLC, Mound, MN (US)

( * ) Notice: Subject to any disclaimer, the term of this patent is extended or adjusted under 35 U.S.C. 154(b) by 0 days.

(21) Appl. No.: 11/082,576

(22) Filed: Mar. 17, 2005

(65) Prior Publication Data

US 2005/0210958 A1   Sep. 29, 2005

Related U.S. Application Data

(60) Provisional application No. 60/556,047, filed on Mar. 24, 2004.

(51) Int. Cl.
*B05B 15/06* (2006.01)
*B05B 3/00* (2006.01)
*B05B 15/10* (2006.01)

(52) U.S. Cl. .............. 239/280.5; 239/280; 239/281; 239/273; 239/276; 239/285; 239/207

(58) Field of Classification Search ............ 239/280.5, 239/280, 281, 722, 273, 275, 276, 200, 207
See application file for complete search history.

(56) References Cited

U.S. PATENT DOCUMENTS

| | | | | |
|---|---|---|---|---|
| 1,187,349 A | * | 6/1916 | Libby | 239/281 |
| 2,614,887 A | * | 10/1952 | Shields | 239/268 |
| 3,750,686 A | | 8/1973 | Cook | |
| 3,897,263 A | * | 7/1975 | Davis et al. | 134/45 |
| 3,931,931 A | * | 1/1976 | Otis | 239/754 |
| 4,784,324 A | * | 11/1988 | DeWitt et al. | 239/165 |
| 4,936,330 A | * | 6/1990 | LaHue | 134/93 |
| 5,526,983 A | * | 6/1996 | Petit | 239/264 |
| 5,556,032 A | * | 9/1996 | Varrichione | 239/279 |
| 5,819,365 A | | 10/1998 | Huffman et al. | |
| 5,901,720 A | * | 5/1999 | Lange | 134/172 |
| 5,961,044 A | * | 10/1999 | Dalbec et al. | 239/77 |
| 5,967,418 A | * | 10/1999 | MacDonald et al. | 239/391 |
| 5,988,529 A | | 11/1999 | Sühring | |
| 6,098,900 A | * | 8/2000 | Smith | 239/201 |
| 6,158,678 A | * | 12/2000 | Lange | 239/532 |
| 6,508,414 B1 | | 1/2003 | Matsumoto et al. | |
| 2002/0046969 A1 | | 4/2002 | Bartsch et al. | |

* cited by examiner

*Primary Examiner*—David A. Scherbel
*Assistant Examiner*—James S. Hogan
(74) *Attorney, Agent, or Firm*—Dicke, Billig & Czaja, PLLC (57) ABSTRACT

A spray rack suitable for testing a window in a building includes a plurality of spray bars and at least one stand-off leg. The plurality of spray bars each include at least one nozzle for spraying fluid. The at least one stand-off leg is coupled with the plurality of spray bars and includes a plurality of pre-measured settings each corresponding to a distance between the at least one nozzle and the window. The at least one stand-off leg is configured to be set at one of the plurality of pre-measured settings to interface with the building and to position the plurality of spray bars a desired distance from the window for testing the window by spraying the fluid from the at least one nozzle of each of the plurality of spray bars toward the window.

24 Claims, 10 Drawing Sheets

PORTABLE SPRAY RACK

CROSS-REFERENCE TO RELATED APPLICATIONS

This patent application claims priority to U.S. Provisional Patent Application Ser. No. 60/556,047, filed Mar. 24, 2004, which is incorporated herein by reference.

BACKGROUND

Exterior home features, such as windows, skylights, curtain walls, and doors, have typically been tested by manufacturers to determine the ability of the window to resist water penetration. However, due to insurance and manufacturer needs, it has become increasingly important to determine the water penetration resistance of exterior home features already installed within a home.

Typical spray racks used to perform water penetration testing are generally not readily portable for use in the field (i.e., at the home where the exterior feature(s) is to be tested). With this in mind, the make-shift spray racks conventionally used in the field are formed of polyvinyl chloride (PVC) pipe with screw-in water spraying valves. When a test is to be performed in the field, the test administrator typically constructs a spray rack of selected lengths from the plurality of PVC pipe lengths he/she must carry to the site for testing. The rack is made to fit the particular size of the window to be tested and screw-in valves are placed along the PVC pipe lengths as required by the particular test standard being applied.

The assembled rack is then set with respect to the feature to be tested. Traditionally, setting the rack includes taping the PVC pipe rack to at least one ladder, and the ladder(s) are placed a particular distance from the exterior feature to be tested. Placement of the spray rack is further exacerbated by the presence of bushes and other obstacles around the window, curtain wall, or door to be tested. In many cases, due to the precise testing standard specifications that must be met (e.g., distance from nozzle to exterior feature, rate of water release toward window, nozzle-to-nozzle spacing, etc.), the time to assemble the make-shift spray rack is generally between 1 and 2 hours.

Once the spray rack is assembled, a garden hose is attached to the make-shift rack. Water is directed to the exterior feature being tested at a particular rate and in a particular pattern from the valves as defined by the water penetration test standard being employed. Following completion of the water penetration test, the PVC pipe rack is disassembled and stored for subsequent user. A typical PVC rack requires approximately 15–30 minutes to tear down.

As the PVC spray racks are used over and over again, the PVC pipe becomes worn making water tight seals between the various pieces of PVC and the valves more difficult to achieve. Namely, threaded connections become stripped and the PVC pipes become brittle and often crack in cold conditions. The deterioration of the condition of conventional PVC spray racks further lengthens the assembly and disassembly time periods for the spray rack. These time delays are further emphasized when a number of windows are tested at a particular site and when various observers must be present during assembly and testing for legal reasons.

SUMMARY

One aspect of the present invention relates to a spray rack suitable for testing a window in a building. The spray rack includes a plurality of spray bars and at least one stand-off leg. The plurality of spray bars each include at least one nozzle for spraying fluid. The at least one stand-off leg is coupled with the plurality of spray bars and includes a plurality of pre-measured settings each corresponding to a distance between the at least one nozzle and the window. The at least one stand-off leg is configured to be set at one of the plurality of pre-measured settings to interface with the building and to position the plurality of spray bars a desired distance from the window for testing the window by spraying the fluid from the at least one nozzle of each of the plurality of spray bars toward the window.

BRIEF DESCRIPTION OF THE DRAWINGS

Embodiments of this invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
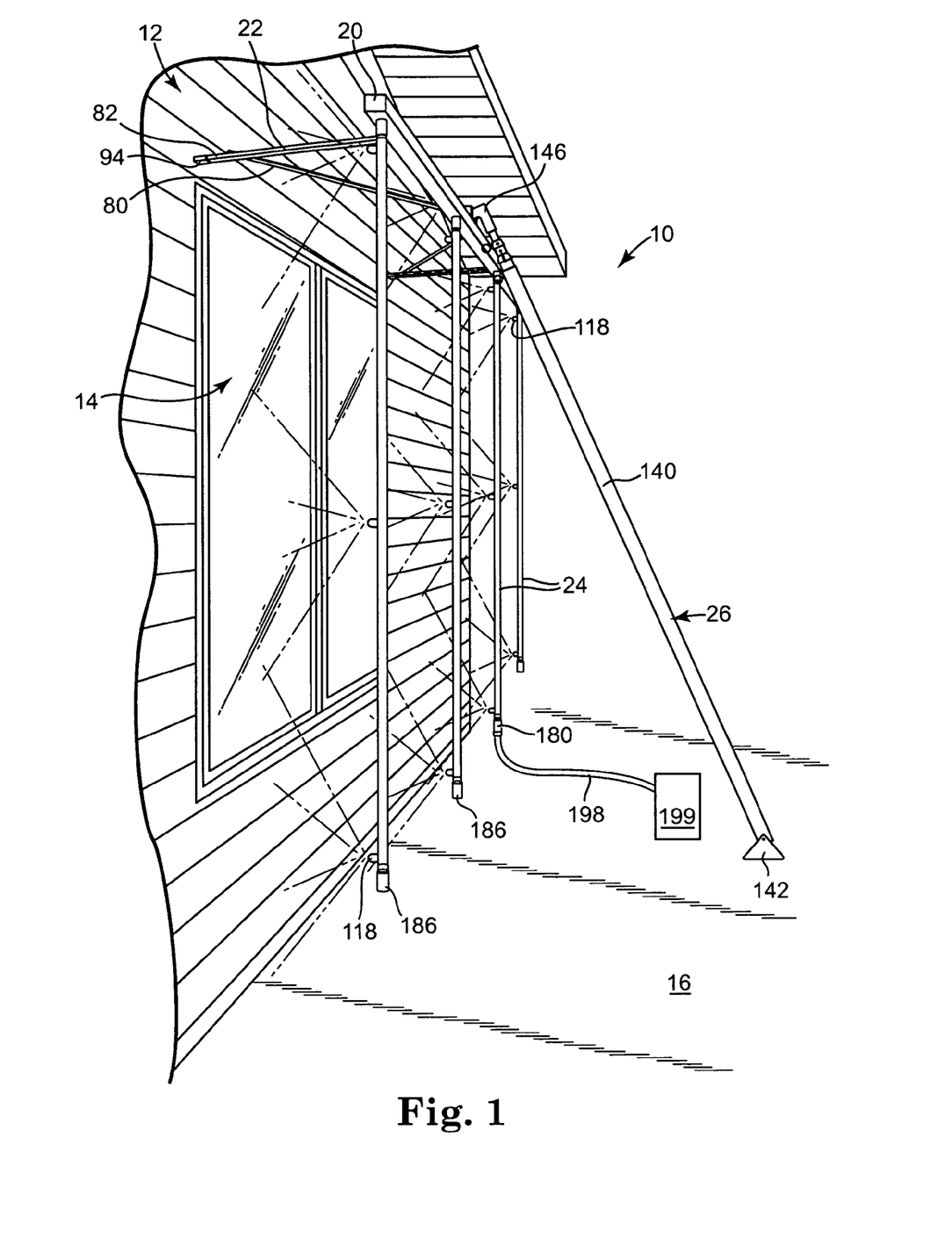
FIG. 1 is a perspective view generally illustrating one embodiment of a spray rack positioned for testing a window.

One embodiment of a spray rack 10 is generally illustrated in the perspective view of FIG. 1. Spray rack 10 is positioned against a building, such as a residential, commercial, or other building, for testing a window 14 included on the exterior of building 12 to determine the level of water penetration through and/or about window 14. In particular, spray rack 10 interfaces with ground 16 near building 12 as well as an exterior side of building 12 in a manner suspending a portion of spray rack 10 in front of window 14. Water is sprayed from spray rack 10 toward windows 14 in order to test the window performance and the level of water penetration through window 14. In one embodiment, spray rack 10 is configured to be spaced from window 14 and is configured with proper dimensions in order to perform a standard water penetration test, such as the ASTM E331-00 "Standard Test Method for Water Penetration of Exterior Windows, Skylights, Doors, and Curtain Walls by Uniform Static Air Pressure Difference." In one embodiment, spray rack 10 is configured to perform any other of various tests for determining the integrity of window 14. In addition, spray rack 10 is configured to test various window sizes and windows 14 being positioned on various stories of building 12.

In one embodiment, spray rack 10 includes a cross bar 20, stand-off legs 22, spray bars 24, and a support leg 26. Stand-off legs 22, spray bars 24, and support leg 26 each selectively attach to cross bar 20 to form spray rack 10. In particular, stand-off legs 22 each extend from cross bar 20 to interface with building 12 during use. Spray bars 24 extend or hang from cross bar 20 in front of window 14 and are configured to deliver water to window 14 during use. Support leg 26 extends from cross bar 20 to interface with ground 16 and to support spray rack 10 above ground 16. Stand-off legs 22 are foldable or collapsible with respect to cross bar 20, and spray bars 24 and support leg 26 are selectively removable from cross bar 20 upon disassembly of the spray rack 10 for storage and transportation. In one embodiment, cross bar 20, stand-off legs 22, spray bars 24, and support leg 26 are each formed of a generally rust-proof material or treated rust-proof material, such as anodized aluminum or other suitable metallic or non-metallic material.

Figure 2A:
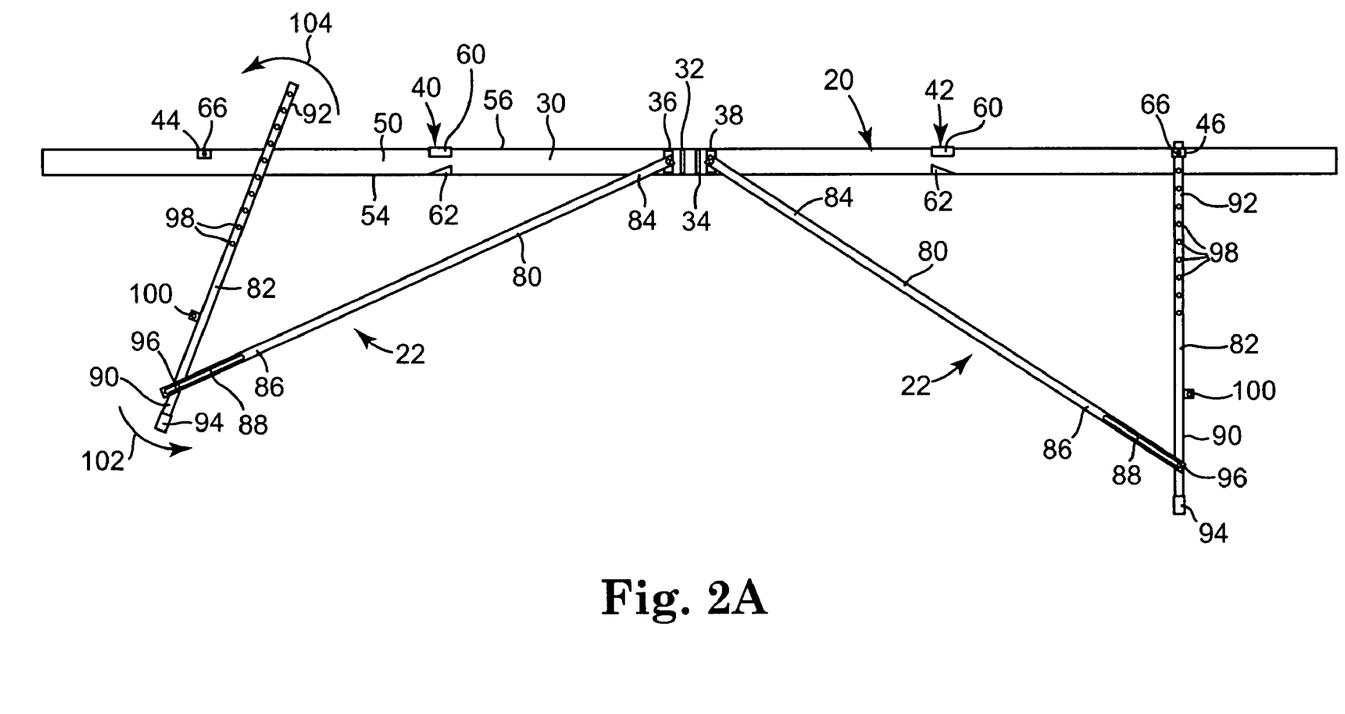
FIG. 2A is a top view of one embodiment of a cross bar with stand-off legs of the spray rack of FIG. 1.
Figure 2B:
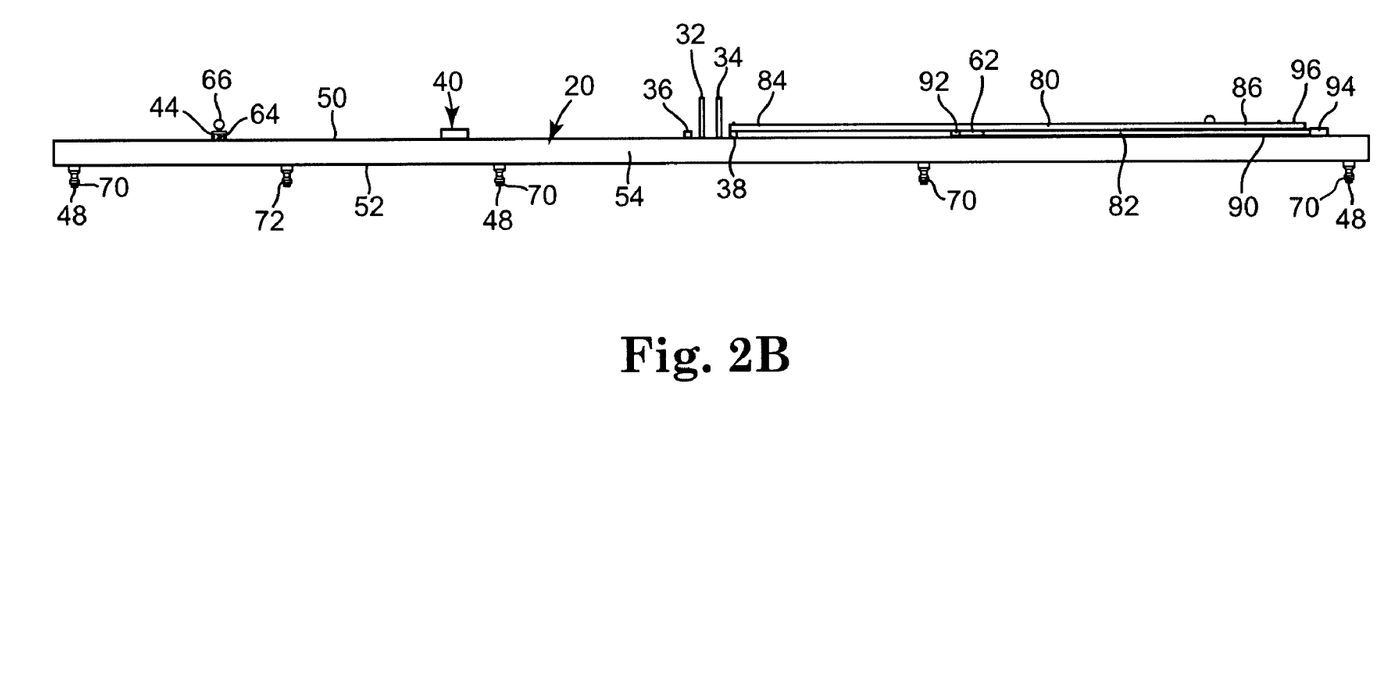
FIG. 2B is a front view of one embodiment of the cross bar with stand-off legs of FIG. 2A.

FIGS. 2A and 2B illustrate a top and front view, respectively, of one embodiment of cross bar 20 with two stand-off legs 22. However, FIG. 2B is illustrated with only one stand-off leg 22 for clarity. Cross bar 20 includes a main elongated portion 30, first and second connection plates 32 and 34, mounting blocks 36 and 38, stops 40 and 42, arches 44 and 46, and a plurality of male portions 48 of quick couplers. Main portion 30 is an elongated, hollow member capped or closed at each end. In one example, main portion 30 is a square pipe defining a top surface 50, a bottom surface 52 opposite top surface 50, a front surface 54 extending between top and bottom surfaces 50 and 52, and a back surface 56 extending between top and bottom surfaces 50 and 52 opposite front surface 54.

First and second connection plates 32 and 34 are spaced from one another and are collectively centered longitudinally along main portion 30 of cross bar 20. More particularly, each connection plate 32 and 34 is secured to and extends from top surface 50 of main portion 30 away from main portion 30. Each connection plate defines an aperture (not illustrated) to facilitate selective coupling of cross bar 20 with support leg 26.

First and second mounting blocks 36 and 38 are spaced from one another and are collectively centered along the length of main portion 30. In particular, first mounting block 36 is spaced from second mounting block 38 a distance further than first connection plate 32 is spaced from second connection plate 34, and each mounting block 36 and 38 is coupled to top surface 50 of main portion 30. In this respect, first mounting block 36 is spaced from first connection plate 32 in a direction opposite second connection plate 34. Similarly, second mounting block 38 is spaced from second connection plate 34 in a direction opposite first connection plate 32. In one embodiment, each mounting block 36 and 38 extends from top surface 50 a predetermined distance as required for mounting stand-off legs 22. As such, as will be described further below, in one embodiment, each mounting block 36 and 38 includes a cavity or aperture extending through mounting block 36 and 38 in a direction generally perpendicular to the extension of main portion 30 with an orientation generally perpendicular to top surface 50 of main portion 30.

First and second stops 40 and 42 are coupled to top surface 50 of main portion 30. In addition, first stop 40 is spaced from second stop 42 a distance greater than the spacing between mounting blocks 36 and 38, and stops 40 and 42 are collectively centered longitudinally along main portion 30. In this respect, first stop 40 is spaced from first mounting block 36 in a direction opposite first connection plate 32. Second stop 42 is spaced from second mounting block 38 in a direction opposite connection plates 32 and 34. In one example, each stop 40 and 42 includes a block portion 60 and an angled portion 62. Block portion 60 is substantially rectangular and is coupled to top surface 50 near back surface 56 of main portion 30. Angled portion 62 is triangularly shaped and is secured to top surface 50 of main portion 30 near front surface 54. As such, block portion 60 and angled potion 62 are laterally spaced from one another. In one embodiment, block portion 60 and angled portion 62 are spaced from one another in a manner to receive at least a portion of stand-off leg 22 between block portion 60 and angled portion 62.

First and second arches 44 and 46 are each coupled to and extend from top surface 50 of main portion 30. In particular, first arch 44 is spaced from first stop 40 in a direction opposite first mounting block 36, and second arch 46 is spaced from second stop 42 in a direction opposite second mounting block 38. As such, first and second arches 44 and 46 are spaced from one another. In one example, first arch 44 and second arch 46 are collectively centered longitudinally along main portion 30. In one embodiment, each arch 44 and 46 is coupled to top surface 50 relatively near back surface 56 as opposed to front surface 54. Each arch 44 and 46 extends from top surface 50 as an inverted U shape. In this respect, first arch 44 is a generally rectangular arch extending over top surface 50 so as to form an opening 64 between a portion of arch 44 and top surface 50. Second arch 46 similarly defines an opening 64. In one example, each arch 44 and 46 includes an aperture (not illustrated) through a top surface of each arch 44 and 46 for selectively receiving a pin 66. With the above in mind, in one embodiment, the positioning of first connection plate 32, first mounting bock 36, first stop 40, and first arch 44 are collectively longitudinally symmetrical along top surface 50 of main portion 30 with respect to second connection plate 34, second mounting block 38, second stop 42, and second arch 46.

Each of the plurality of male portions 48 of quick couplers extend from bottom surface 52 of main portion 30. In one example, the plurality of male portions 48 include a plurality of spray bar male portions 70 each configured to receive one spay bar 24. In one example, spray bar male portions 70 are evenly spaced along main portion 30 of cross bar 20. In one example, spray bar male portions 70 are evenly spaced two feet apart along main portion 30 in accordance with the ASTM E331 standard. Other spacing of spray bar male portions 70 is also contemplated.

In one embodiment, the plurality of male portions 48 additionally includes a gauge male portion 72. In one embodiment, gauge male portion 72 is not evenly spaced along main portion 30 with respect to spray bar male portions 70. Each of the male portions 48 are part of a quick coupler including a first or male portion and a second or female portion or any other suitable quick couplers capable of mechanically coupling two parts while allowing a fluid to flow between the two parts, such as the quick couplers typically used between pneumatic or hydraulic tools and supply hoses. In this respect, in one embodiment, the plurality of male portions 48 of quick couplers are alternatively a plurality of female portions of quick couplers.

In one embodiment, each stand-off leg 22 includes a support member 80 and a main member 82. Support member 80 is an elongated member including a first end 84 and a second end 86. An aperture (not shown) is formed through first end 84 and is configured to permit rotatable coupling of first end 84 to one of mounting blocks 36 and 38 of cross bar 20. Second end 86 is opposite first end 84 and defines an elongated slot 88. In one embodiment, spray rack 10 includes two stand-off legs 22 wherein one stand-off leg 22 is coupled to first mounting block 36 and the second stand-off leg 22, more particularly one support member 80, is coupled to second mounting block 38.

Main member 82 is an elongated member defining a first end 90 and a second end 92 opposite first end 90. In one embodiment, first end 90 includes a rubber tip 94 or other suitable skid-resistant tip configured to interface with building 12 (illustrated in FIG. 1). An aperture (not illustrated) is formed near first end 90 and is configured to facilitate coupling of main member 82 to support member 80. In particular, in one embodiment, a pin or other connector 96 extends through slot 88 of each support member 80 and into the aperture of the respective main member 82. In this manner, main member 82 is rotatably coupled to support member 80. In one embodiment, connector 96 is adjustable or, more particularly, can be tightened or loosened. In one embodiment, when connector 96 is tightened, main member 82 is generally not rotatable about connector 96 or slideable along slot 88 of support member 80. However, in one example, when connector 96 is loosened, main member 82 is rotatable about connector 96, and connector 96 is slideable along slot 88 of support member 80.

In one embodiment, a plurality of measured apertures 98 are formed along main member 82 relatively near second end 92. Each of the plurality of measured apertures are configured to correspond with a spacing of spray rack 10 from building 12 (illustrated in FIG. 1). In particular, in one embodiment, each of the plurality of measured apertures 98 correspond to a spacing of spray rack 10, in particular, spray bars 24, from building 12 a distance of 20 inches, 19 inches, 18 inches, etc. As such, each of the plurality of measured apertures 98 provide a pre-measured setting for spray rack 10. In one embodiment, each of the plurality of measured apertures 98 are marked with measured indicia (not shown) indicating the stand-off distance that would be achieved by utilizing one of the plurality of measured apertures 98. In one example, each indicia, states which measured aperture 98 corresponds to a spacing of 20 inches from window 14 at one of a plurality of inset distances commonly used with windows with respect to exterior building 12. In one example, each of the plurality of measured apertures 98 are positioned at a top surface of main member 82. In one example, a block 100 is positioned along main member 82 between connector 96 and the plurality of measured apertures 98 and is positioned along a back or outside surface of main member 82.

With the above in mind, each stand-off leg 22 is positioned to be rotatably coupled to cross bar 20. More particularly, each support member 80 is rotatable about its connection with mounting block 36 or 38 and each main member 82 is rotatable about the respective connector 96 coupling to support member 80. In this respect, in one embodiment, stand-off leg 22 is moveable between a first or storage position as illustrated on the right hand side of FIG. 2B to a second or stand-off position as illustrated in the right hand side of FIG. 2A. In particular, in the storage position illustrated in FIG. 2B, main member 82 is placed between block portion 60 and angled portion 62 of stop 42 to at least partially secure stand-off leg 22 relative to cross bar 20 in storage position. In addition, in one example, when in the storage position, block 100 is sized and positioned to fit within opening 64 of arch 46 such that pin 66 placed through arch 46 and into block 100 also serves to selectively maintain stand-off leg 22 in a stored position. The other stand-off leg 22 similarly is configured to interface with first arch 44.

Upon removal of pin 66 and movement of main member 82 from stop 40 or 42, support member 80 is rotated about its connection with mounting block 36 or 38 as generally illustrated on the left side of FIG. 2A by arrow 102. Simultaneously or subsequently, main member 82 is rotated about connector 96 as generally illustrated by arrow 104. Moreover, main member 82 is moved with respect to support member 80 by sliding connector 96 along slot 88. In one embodiment, connector 96 is tightened while stand-off leg 22 is in the stored position and loosened in order to rotate main member 82 and slide connector 96 along slot 88. Support member 80 and main member 82 continue to be rotated and moved until main member 82 can be slid at least partially through opening 64 of arch 44 or 46. Pin 66 is replaced through the respective arch 44 or 46 and into main member 82 of the respective stand-off leg 22. In one embodiment, connector 96 is tightened to facilitate the maintenance of stand-off leg 22 in the use or stand-off position.

In this respect, main member 82 is selectively coupled to cross bar 20 in a stand-off position. In one embodiment, main member 82 can be slid through the respective arch 44 or 46 a desired distance in order for pin 66 to interface with the one of the plurality of measured apertures 98 corresponding to the desired positioning of spray rack 10 relative to window 14 (illustrated in FIG. 1). In on embodiment, in the stand-off position, support member 80 extends from main portion 30 of cross bar 20 at an angle between 15° and 75°. Each stand-off leg 22 is selectively movable from the stand-off position of FIG. 2A back toward the storage position of FIG. 2B by simply reversing the steps described herein. Accordingly, when in the storage position, stand-off legs 22 and cross bar 20 form a collectively elongated object providing for ease of storage and transportation, while still being moveable to the stand-off position of FIG. 2A for use during window testing. Other methods for coupling stand-off legs 22 to cross bar 20 in manner providing for pre-measured and reliable connection to cross bar 20 are also contemplated. For example, in one embodiment, support member 80 is configured to interface with building 12 rather than main member 82.

Figure 3:
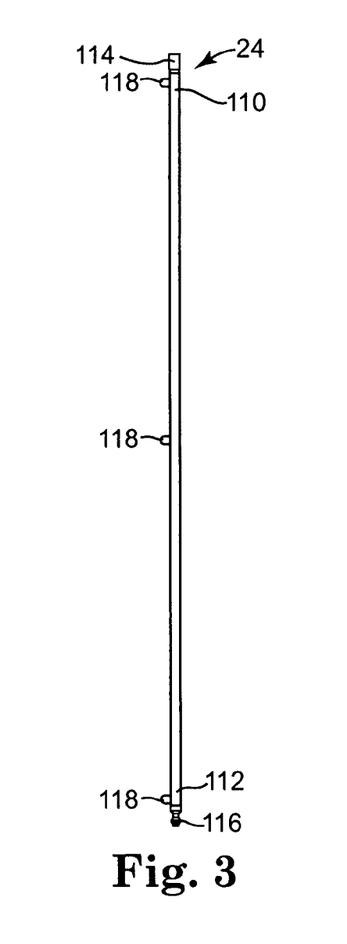
FIG. 3 is a side view of one embodiment of a spray bar of the spray rack of FIG. 1.

FIG. 3 illustrates one embodiment of one of the plurality of spray bars 24. Spray bar 24 is generally an elongated, hollow member defining a first end 110 and a second end 112 opposite first end 110. Spray bar 24 includes a female portion 114 of a quick coupler, a male portion 116 of quick coupler, and a plurality of nozzles 118. Female portion 114 is secured to first end 110 of spray bar 24, and male portion 116 is secured to second end 112 of spray bar 24. In particular, female portion 114 is configured to interact with a spray bar male portion 48 of cross bar 20 upon assembly of spray rack 10. However, in other embodiments, the positioning of female portion 114 and male portion 116 with respect to first and second ends 110 and 112 is the opposite of that described above. Each portion 114 and 116 is secured to the remainder of spray bar 24 in a manner providing for a generally waterproof or leakage proof seal to spray bar 24.

The plurality of nozzles 118 are each secured to a common side or edge of spray bar 24 and are longitudinally spaced along spray bar 24. In one embodiment, each nozzle 118 is evenly spaced along spray bar 24 in two feet increments in accordance with ASTM E331-00. Other spacing of nozzles 118 is also contemplated. Each of the nozzles 118 is secured to the remainder of spray bar 24 by a threaded attachment, sealant, adhesive, weld, and/or other generally leak proof attachment means. In one embodiment, the spray nozzles 118 are made of stainless steel, brass, or other suitable material. In one embodiment, each of the plurality of nozzles 118 is configured to spray fluid as a hollow cone. More particularly, in one embodiment, each of the plurality of nozzles 118 is configured to spray a surface positioned 20 inches away from each nozzle 118 to form a water or spray cone with an approximate 3 foot diameter in accordance with ASTM E331-00. Use of other suitable nozzles is also contemplated.

Figure 4:
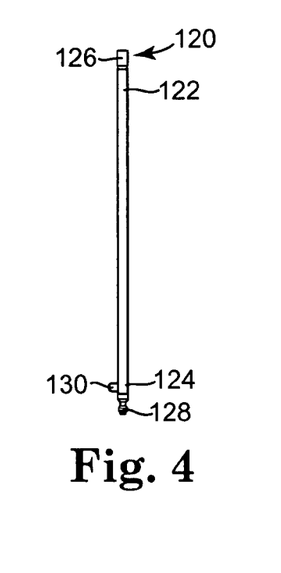
FIG. 4 is a side view of one embodiment of a spray bar extension for use with the spray rack of FIG. 1.

FIG. 4 illustrates one embodiment of a spray bar extension 120 for optional inclusion with spray rack 10. Extension 120 is similar to spray bar 24. As such, extension 120 is a generally elongated, hollow member defining a first end 122 and a second end 124 opposite first end 122. A female portion 126 of the quick coupler is secured to first end 122 and a male portion 128 of a quick coupler is secured to second end 124 in a similar manner as described with respect to female and male portions 114 and 116 of quick couplers with respect to first end 110 and second end 112 of spray bar 24. At least one nozzle 130 extends from extension 120 relatively near second end 124. As such, extension 120 is configured to be coupled with spray bar 24 as desired by mating female portion 126 of extension 120 with male portion 116 of spray bar 24 to thereby extend the overall length of each spray bar 24. In one embodiment, extension 120 is primarily used in situations in which relatively large windows are being tested.

Figure 5:
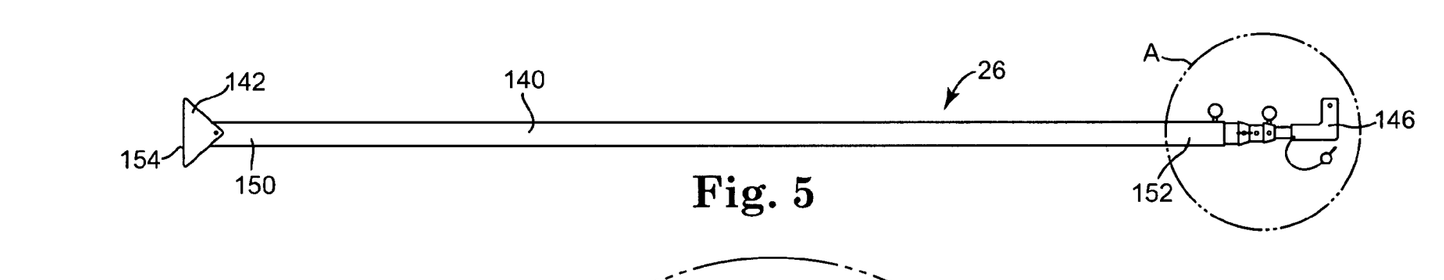
FIG. 5 is a side view of one embodiment of a support leg of the spray rack of FIG. 1.
Figure 5A:
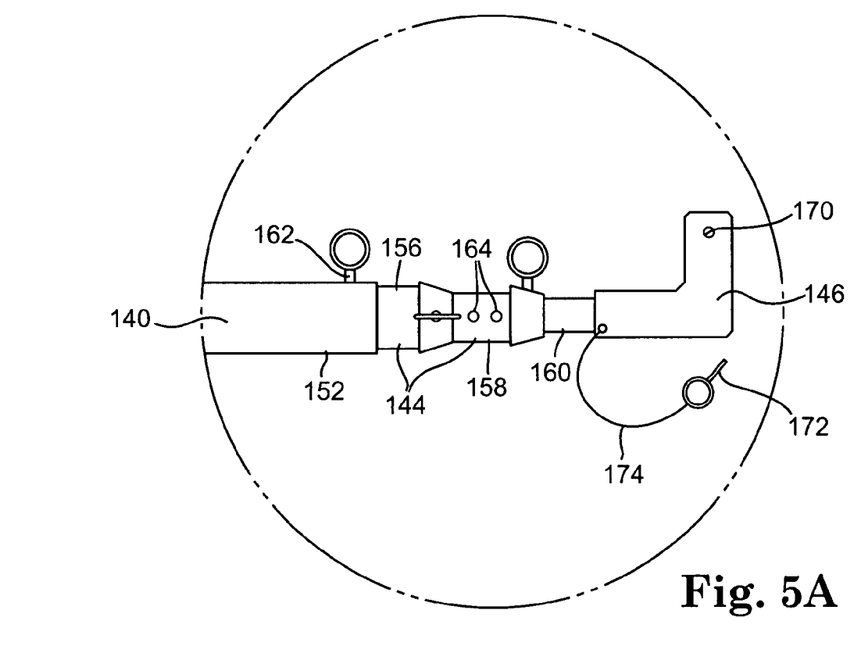
FIG. 5A is a detailed view of the portion of FIG. 5 indicated at A.

FIGS. 5 and 5A collectively illustrate one embodiment of support leg 26 including a main portion 140, a foot 142, a plurality of telescoping sections 144, and a connection plate 146. Main portion 140 is a hollow cylindrical, square, or rectangular tube defining a first end 150 and a second end 152 opposite first end 150. Foot 142 is rotatably coupled to first end 150 of main portion 140 and configured to interface with ground 16 (illustrated in FIG. 1) during use of spray rack 10. In one embodiment, foot 142 includes a skid resistant bottom surface 154 to prevent movement of spray rack 10 relative to ground 16 during use.

The plurality of telescoping sections 144 each have a similar cross-sectional shape as main portion 140, but are each sized progressively smaller than main portion 140. The plurality of telescoping sections 144 are positioned partially within main portion 140 and extend or are extendable out second end 152 of main portion 140. In one example, the plurality of telescoping sections 144 includes a first telescoping section 156, a second telescoping section 158, and a third telescoping section 160 wherein each telescoping section 144 is a generally elongated member. In one embodiment, first telescoping section 156 selectively fits within main portion 140, second telescoping section 158 selectively fits within first telescoping section 156, and third telescoping section 160 selectively fits within second telescoping section 158.

In one embodiment, main portion 140 defines at least one aperture, with a pin 162 or other suitable clamp or tension screw. Each telescoping section 144 includes a plurality of apertures 164 longitudinally spaced along the shaft of each telescoping section. With this in mind, when first telescoping section 156 is positioned as desired with respect to main portion 140 (i.e., to extend a desired distance from second end 152 of main portion 140), pin 162 is placed through the aperture of main portion 140 and into one of the plurality of aperture 164 of first telescoping section 156 to maintain first telescoping section 156 in the desired position. The ends of first telescoping section 156 and second telescoping section 158 each similarly defines an aperture configured to receive a pin 162 to interface with one of a plurality of apertures 164 along the shaft of the second telescoping section 158 and the third telescoping section 160, respectively. As such, the telescoping sections 144 can each be adjusted to extend from the previous telescoping section 144 until support leg 26 has a desired total length to interface with a particular window 14 (illustrated in FIG. 1). In one embodiment, support leg 26 is configured to support spray rack 10 for testing windows on first, second, or other stories of building 12 (illustrated in FIG. 1).

Connection plate 146 extends from the telescoping end of the final or smallest telescoping section, i.e. third telescoping section 160. In one embodiment, connection plate 146 is a generally L-shaped plate defining an aperture 170 at a position opposite the connection of connection plate 146 to the respective telescoping section 144. In one embodiment, an additional pin 172 is attached to connection plate 146 or third telescoping section 160 with a lanyard 174 in order to maintain pin 172 proximate to aperture 170 for access during assembly of spray rack 10. In one embodiment, support leg 26 is formed of T-6 aircraft grade aluminum.

Figure 6:
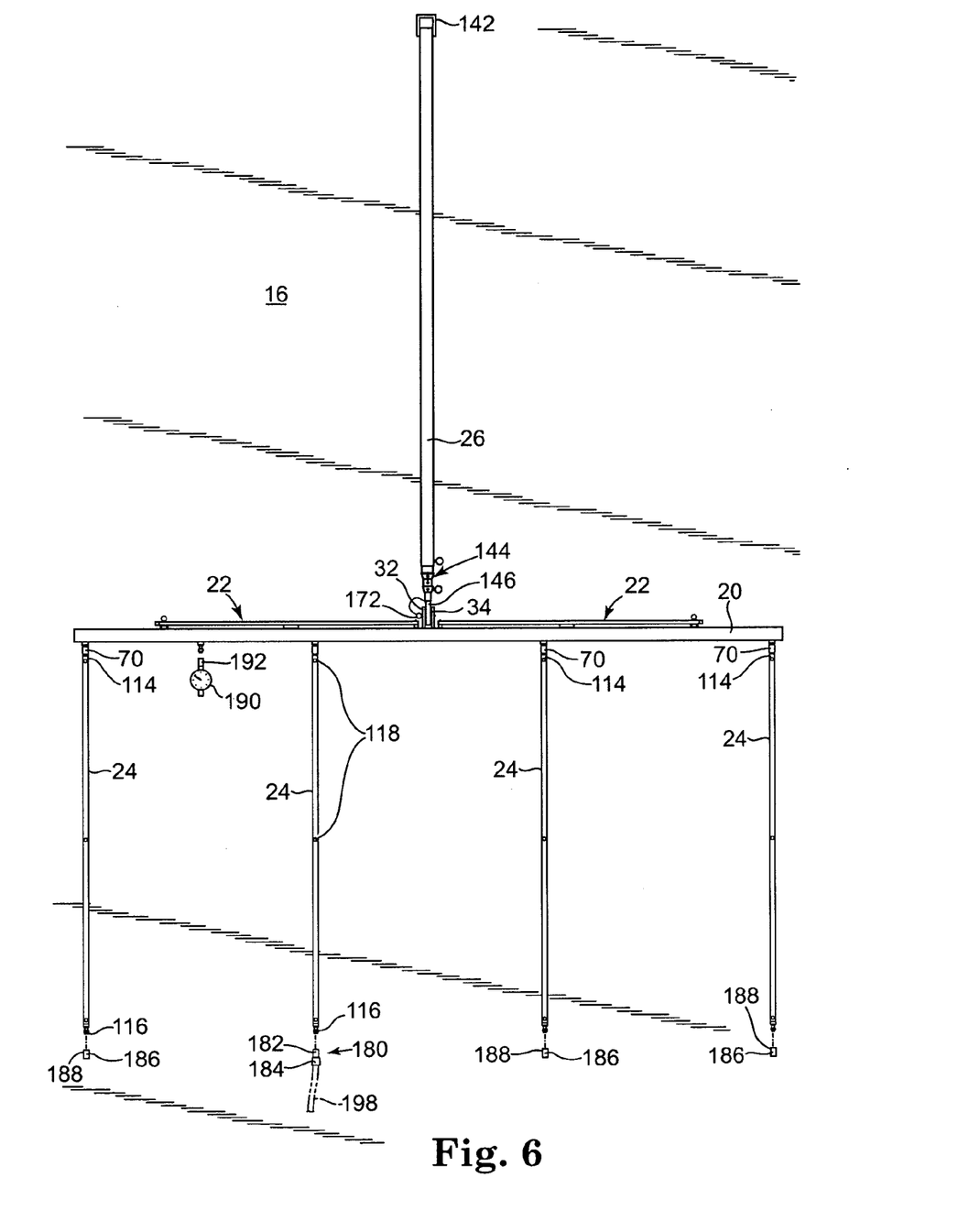
FIG. 6 is a top view of one embodiment of a partially assembled spray rack positioned on the ground.

Referring to the partially assembled view of spray rack 10 in FIG. 6, in one embodiment, spray rack 10 additionally includes a water supply connector 180. Water supply connector 180 includes a female portion 182 of a quick coupler and a hose connector 184. Female portion 182 is configured to be coupled with any one of the male portions 116 the plurality of spray bars 24 or the plurality of extensions 120 if they are in use. Hose connector 184 is configured to receive a hose 198 in fluid connection with a water supply 199 (illustrated in FIG. 1), such as a garden hose connected to a home water supply and/or a separate water pump. In this manner, during use, water from water supply 199 travels through hose 198 and into the respective spray bar 24. Due to the coupling of spray bars 24 with cross bar 20 to allow fluid communication between one another, the water travels from first spray bar 24 through cross bar 20 and into the other spray bars for dispersion out the plurality of nozzles 118.

In one embodiment, each spray bar 24 not coupled to water supply connector 180 is coupled to a plug 186. In particular, each plug 186 includes a female portion 188 of a quick coupler and is configured to stop the flow of fluids, such as water. As such, female portion 188 of each plug 186 is coupled to a male portion 116 of one spray bar 24 to decrease or prevent water flow out of the free ends of spray bars 24 through male portion 116. In one embodiment, in which one or more spray bar male portions 70 of cross bar 20 are not coupled with one of spray bars 24, those spray bar male portions 70 are coupled to female portion 188 of a respective plug 186 to similarly decrease or prevent water flow out of the spray bar male portions 70 not coupled to a spray bar 24. By plugging the end of spray bars 24 and/or spray bar male portions 70 of cross bar 20, the water pressure within spray rack 10 is more easily maintained.

Moreover, in one embodiment, in order to facilitate maintenance and monitoring of water pressure within spray rack 10, spray rack 10 includes a pressure gauge 190. In one example, pressure gauge 190 includes a female portion 192 of a quick coupler for attaching to gauge male portion 72 of cross bar 20. As such, pressure gauge 190 is in fluid communication with the water traveling through cross bar 20 and outputs a measurement of the water pressure of the water traveling through spray rack 10. As such, if during use the water pressure falls below a desired level, the test operator will be notified that a water pump may need to be added to the water supply.

Figure 7:
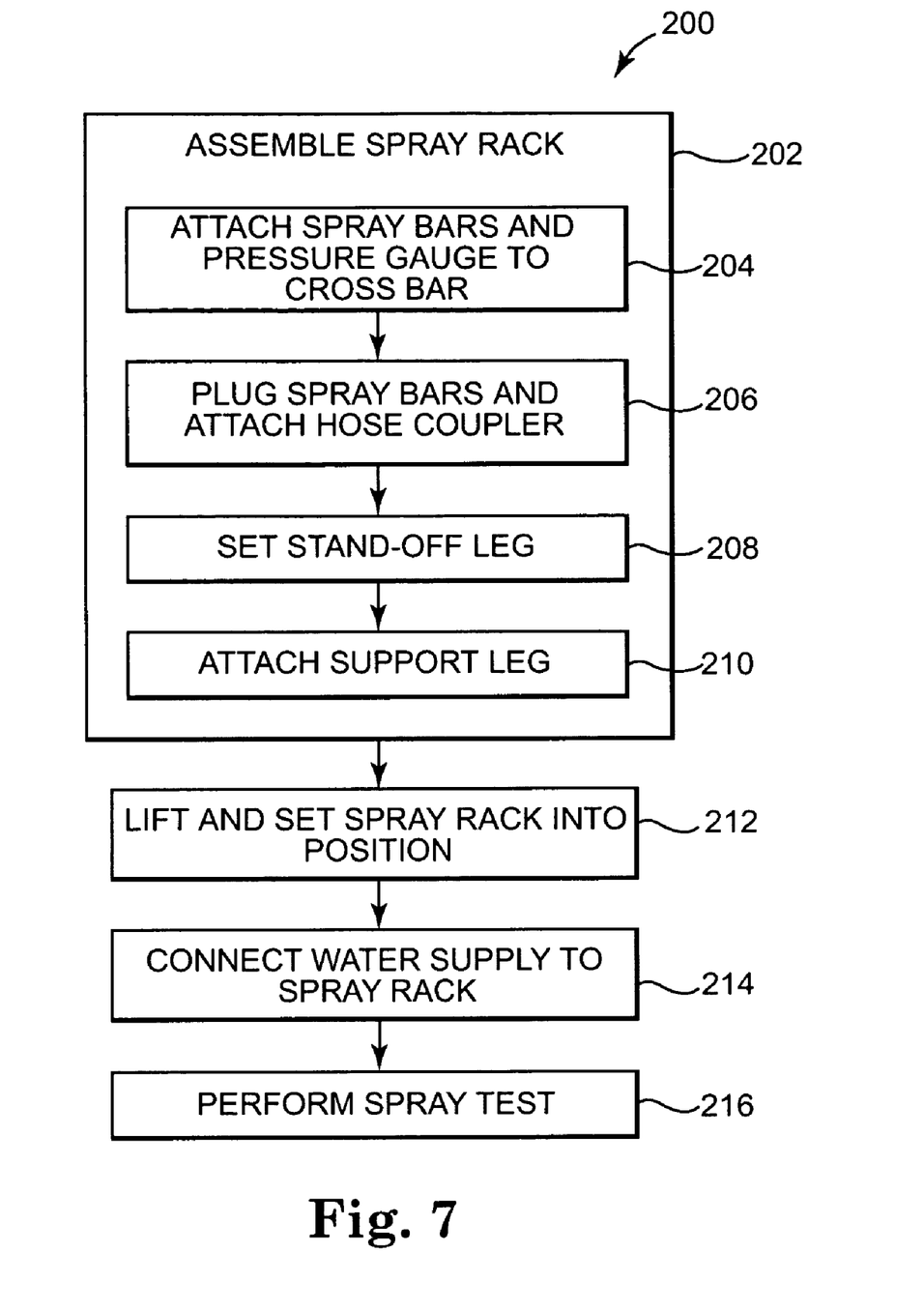
FIG. 7 is a flow chart illustrating one embodiment of a method of using a spray rack.

FIG. 7 illustrates one embodiment of a method of using spray rack 10 generally at 200. At 202, spray rack 10 is assembled. In one embodiment, the assembly of spray rack at 202 is substantially completed on ground 16 as illustrated with additional reference to FIG. 6. In particular, back surface 56 of cross bar 20 is positioned on ground 16. At 204, the desired number of spray bars 24 are coupled to cross bar 20 as well as a pressure gauge 190 being coupled to cross bar 20. In particular, the number of spray bars 24 to be attached to cross bar 20 is dependent upon the size of window 14 to be tested.

Figure 8A:
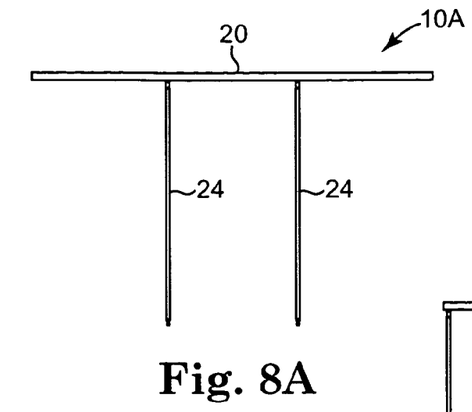
FIGS. 8A–8D each illustrate one embodiment of a front view of a cross bar and spray bars and/or spray extensions according to various configurations of a spray rack.
Figure 8B:
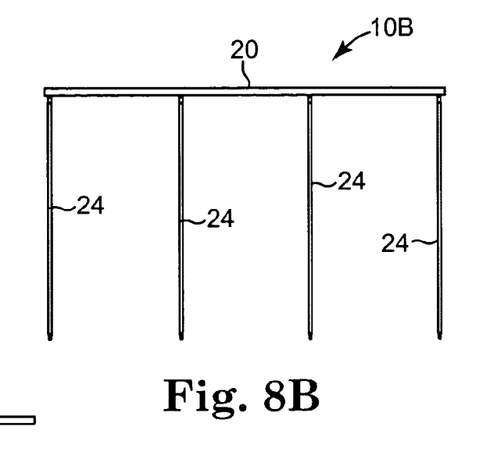
Figure 8C:
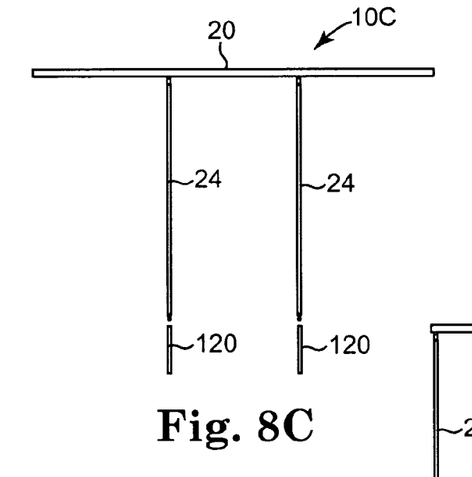
Figure 8D:
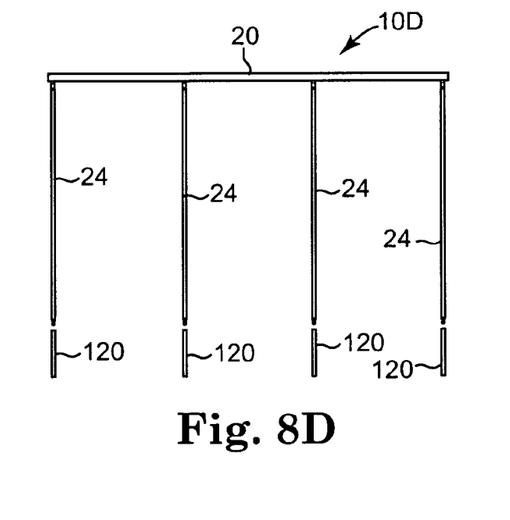

For example, turning to the various configurations of spray rack 10 illustrated in FIGS. 8A–8D, the width of the window to be tested is first used to determine how many spray bars 24 need to be coupled with cross bar 20. In particular, in one embodiment, if the window to be tested has a width of 4 feet or less, a spray rack configuration 10A as illustrated in FIG. 8A may be utilized in which only two spray bars 24, namely the middle two spray bars 24 are coupled to cross bar 20. However, if the window to be tested is wider, such as up to 7 feet wide, all four spray bars 24 are generally attached to cross bar 20 in spray rack configuration 10B as illustrated in FIG. 8B. In one embodiment, intermediate spray rack configuration (not illustrated) such as configurations for windows up to five feet wide could be used coupling three spray bars 24 to cross bar 20.

Once the overall width of the window is determined, the height of the window is used to determine whether or not extensions 120 should be utilized. In one embodiment, for windows with a height of 5 feet or less, extensions 120 are not utilized as illustrated in spray rack configurations 10A and 10B. However, in one embodiment for windows having a height between 5 feet and 7 feet, an extension 120 is coupled to each spray bar 24 previously coupled to cross bar 20 as illustrated in spray rack configurations 10C and 10D. Other configurations of spray rack 10 including spray rack configurations sized to test windows greater than 7 feet by 7 feet are also contemplated.

In particular, each spray bar 24 is attached to cross bar 20 by interfacing female portion 114 of spray bar 24 with spray bar male portion 70 of cross bar 20. By mating the female and male portions 114 and 70, each spray bar 24 is quickly coupled with cross bar 20 such that all nozzles 1198 are directed away from ground 16 in the assembly position of FIG. 6. The coupling provided by the quick coupler is a fluid flow coupling in which fluid can flow through spray bar 24 and into cross bar 20 or vice versa. In other embodiments, male coupler may be included on each spray bar 24 and female couplers may be included on cross bar 20. Similarly, if extensions 120 are determined to be necessary, an extension 120 is coupled to each spray bar 24 that is coupled to cross bar 20. In particular, female portion 126 of extension 120 is coupled with male portion 116 of the respective spray bar 24. Upon coupling of each desired spray bar 24 and extension 120, in one embodiment, pressure gauge 190 including a female portion 192 of quick coupler is secured to gauge female portion 72 of cross bar 20. In this respect, pressure gauge 190 is coupled with cross bar 20 in a manner allowing fluid flow between cross bar 20 and pressure gauge 190.

At 206, either a water supply connector 180 or a plug 186 is coupled to the free end of each spray bar 24 or extension 120 opposite cross bar 20. In the illustration shown in FIG. 6, in which no extensions 120 are utilized, a water supply connector 180 is coupled to the free end of one spray bar 24. In particular, female portion 182 of water supply connector 180 is selectively coupled to male portion 116 on the free end of a spray bar 24.

Water supply interface 184, such as a hose connector, of water supply connector 180 is configured to interface with and be tightly secured the end of a common garden hose 198 (illustrated in FIG. 1). All other remaining free ends of spray bars 24 are coupled with a plug 186. In particular, female portion 188 of each plug 186 is coupled to male portion 116 of remaining spray bars 24, male portions 128 of remaining extensions 120, or spray bar male portions 70 of cross bar 20. As plugs 186 generally decrease or prevent the flow of fluid out the free end of each spray bar 24 or extension 120 not coupled to water supply connector 180.

At 208, each stand-off leg 22 is set in place as required for the particular window being tested. As such, as described above, pin 66 is removed from first arch 44, and stand-off leg 22 is rotated from storage position to stand-off position. As such, main member 82 is placed through opening 64 of first arch 44 and pin 66 is replaced through pin arch 44 and one of the measured apertures 98 of support member 80. In this respect, for ASTM E331-00 if the window being tested is not inset with respect to the external surface of the building, pin 66 is placed through the measured aperture 98 corresponding to a 20 inch test distance without a window inset. Similarly, if the window is inset an inch or more with respect to the external surface of the building, the pin 66 is placed within a different one of the measured apertures 98 as required to account for the window inset distance. Once the pin is in place, connector 96 is tightened to prevent rotation of main member 82 about support member 80.

At 210, support leg 26 is attached to cross bar 20. In one embodiment, while cross bar 20 is still positioned on ground 16, support leg 26 is positioned such that connection plate 146 is placed between first and second connection plates 32 and 34 of cross bar 20. More particularly, aperture 170 of connection plate 146 is aligned with the aperture in each connection plate 32 and 34, and pin 172 is manipulated to be placed through the aperture of first connection plate 32, aperture 170 of connection plate 146, and finally through the aperture of second connection plate 34 in a manner rotatably securing support leg 26 to cross bar 20. Once support leg 26 is coupled to cross bar 20, the telescoping sections 144 of support leg 26 are adjusted such that support leg 26 extends from cross bar 20 a desired distance as required by the positioning of the window upon building 12. In particular, the plurality of telescoping sections 144 would be adjusted to form a longer support leg 26 for testing a second story window as opposed to testing a first story window. In one embodiment, the entire assembly of spray rack 10 and 202 is completed within a less than 5 minute time period, for example, in a 2 minute time period.

Figure 9:
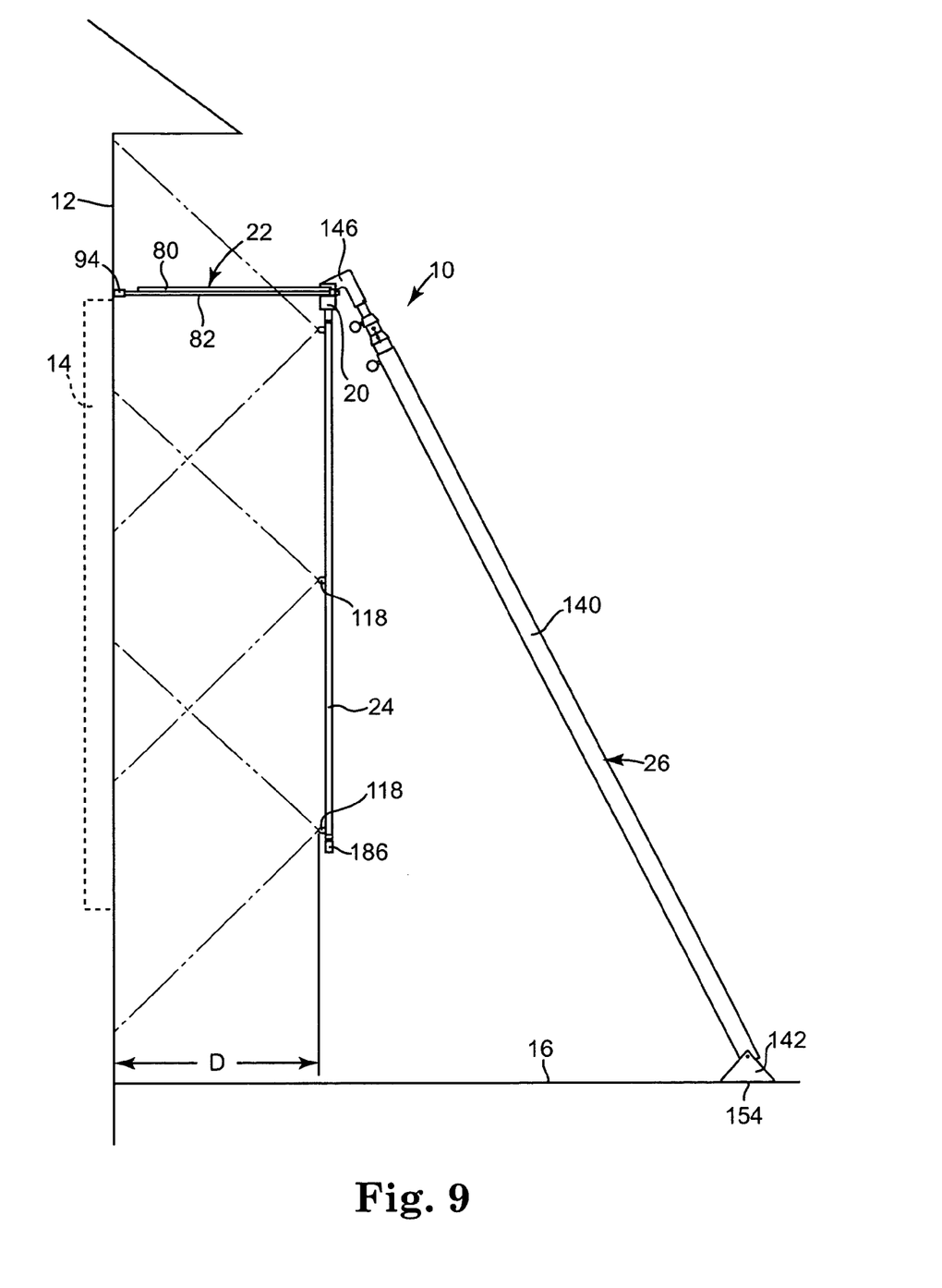
FIG. 9 illustrates a side view of one embodiment of a spray rack in use.

At 212, the assembled spray rack 10 is lifted and set into position for testing. In one embodiment, spray rack 10 is sufficiently light such that a single person grasping support leg 26 can lift the entire spray rack 10 from ground 16 up toward window 14 (illustrated in FIG. 1). Upon lifting of support leg 26, cross bar 20 rotates with respect to support leg 26 until spray bars 24 extend from cross bar 20 in a substantially vertical manner. Spray rack 10 is continued to be moved toward window 14 and building 12 in a manner centering spray rack 10 on the width of window 14 and placing stand-off legs 22 to interact with building 12 just above window 14 as illustrated with additional reference to FIG. 9. In the desired placement, rubber or skid resistant tips 94 of main members 82 of stand-off legs 22 interface with building 12. Upon positioning stand-off legs 22 to interface with building 12 and spray bars 24 to be positioned accordingly on window 14, support leg 26 is rotated until foot 142 interacts with ground 16 to support the entire spray rack 10 above ground 16. In one embodiment, once set in position, the operator can release support leg 26 and spray rack 10 is fully supported by ground 16 and building 12.

At 214, water supply 199 (illustrated in FIG. 1) is connected to spray rack 10. In one embodiment, water supply 199 is coupled to spray rack 10 via hose 198 (illustrated in FIG. 1). The end of hose 198 opposite the end connected to water supply 199 is coupled to water supply connector 180, in particular, hose connector 184. In one embodiment, water supply 199 can additionally include pumps or other devices as needed to achieve the desired water pressure through spray rack 10 during testing. At this point, spray rack 10 is positioned and ready for testing. At 216, the spray test is performed. In one embodiment, the spray test is performed according to water penetration testing standards, such as ASTM E331-00. Accordingly, in one embodiment, nozzles 118 of spray rack 10 are properly positioned relative to window 14 such that the hollow spray cones emitted from nozzles 118 overlap as desired. In particular, in one embodiment, the nozzles 118 are spaced on a two foot grid, and each nozzle produces a hollow spray cone contacting building 12 and/or window 14 with a diameter of 3 feet inherently overlapping the hollow spray cones.

During testing, the operator observes pressure gauge 190 to monitor the water pressure in spray rack 10. In one embodiment, spray rack 10 is configured to distribute about 5 gallons of water per hour during testing. Following spray testing, spray rack 10 is lowered from window 14 and disassembled in a manner opposite that described in the assembly and setup process included in the method of use 200.

In one embodiment, a plurality of spray racks 10 are used in combination to test larger windows. In one embodiment, spray rack 10 includes an additional cross bar interfacing with the otherwise free ends of spray bars 24, such as interfacing with quick couplers. In one example, the additional cross bar includes quick coupler portions on both the top and bottom surfaces of the additional cross bar, and spray bars 24 are coupled with the quick coupler portions on both surfaces of the additional cross bar. In one embodiment, at least one quick coupler portion is attached to an end of main portion 30 of cross bar 20 for end-to-end attachment to a main portion 30 of another cross bar 20. As such, spray racks according to embodiments of the invention are expandable for use in commercial as well as residential settings. In one embodiment, wheels may be attached to stand-off legs 22 to facilitate lowering of spray rack 10 down the side of a building.

Figure 10A:
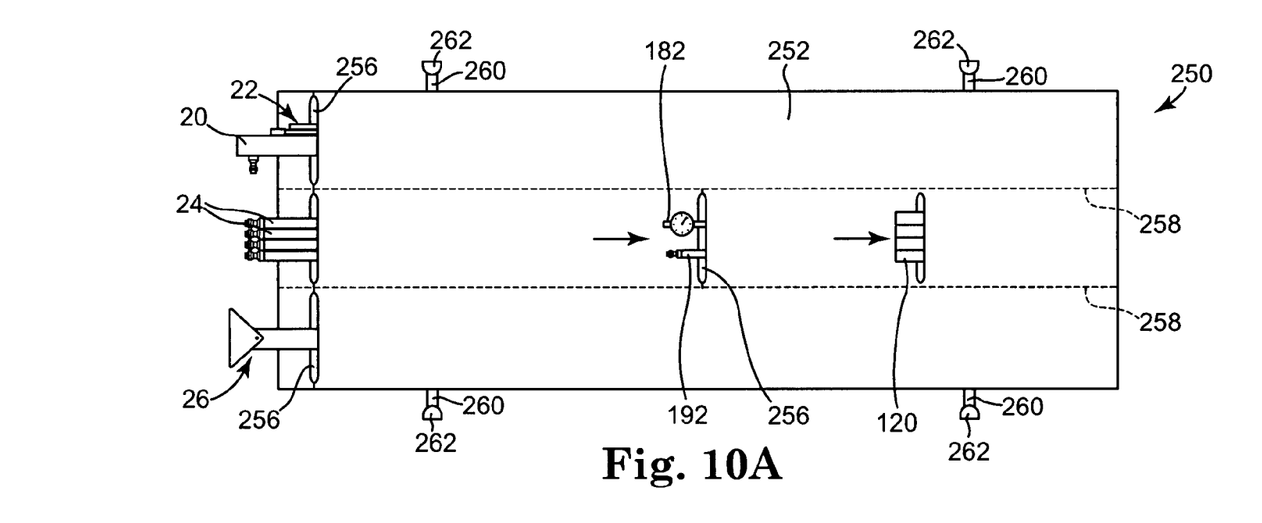
FIG. 10A illustrates a top view of one embodiment of an open bag for storing and transporting a spray rack.
Figure 10B:
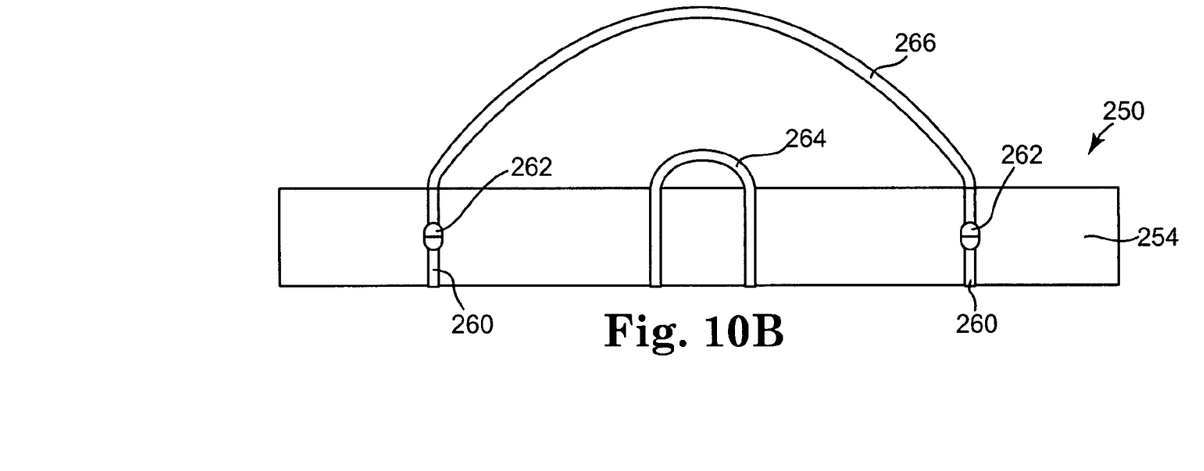
FIG. 10B illustrates a side view of one embodiment of a closed bag for storing and transporting a spray rack.

As illustrated in FIGS. 10A and 10B, in one embodiment, a bag 250 is provided for storing and facilitating transportation of disassembled spray rack 10. In one example, bag 250 defines an inside surface 252 and an outside surface 254. As illustrated in FIG. 10A, when in the unfolded position, bag 250 lies in a substantially flat manner. Bag 250 additionally defines a plurality of pockets 256 open to inside surface 252 and each configured to receive at least one component of the spray rack 10 (i.e. cross bar 20, stand-off legs 22, spray bar 24, support leg 26, extension 120, water supply connector 180, pressure gauge 190, and/or plugs 186). Each component can be easily slid into its respective pocket 256.

Upon positioning of each component within its respective pocket 256, bag 250 is folded along fold areas 258, which in one embodiment, are defined between pockets 256. In one embodiment, closure straps 260 extend about the outside surface 254 of bag 250. Bag 250 is folded along fold areas 258, and closure straps 260 are tightened and buckled with buckles 262 to securely hold bag 250 in the closed or folded position. In one example, bag 250 additionally includes handles 264 and/or a shoulder strap 266 to facilitate transportation of bag 250 with spray rack 10 by a single individual. Accordingly, bag 250 provides for relatively easy transport and storage of spray rack 10. In one embodiment, bag 250 is similar in size to a bag for common snow skis. In this respect, bag 250 is sized for ease of transport on various forms of commercial transportation, such as, vans, buses, airlines, etc.

Accordingly, a spray rack as described in the above embodiments of the invention provides a time efficient, space efficient, and reliable means for testing exterior windows for water penetration. In particular, the stand-off legs provide a reliable means for setting the distance between the spray nozzles and the window without requiring trial and error measurement of the distance and adjustment of the spray rack set-up. In addition, the quick coupling of the spray bars to the cross bar provides for a quick, easy, and reliable assembly and disassembly of the spray rack. Moreover, use of the support leg allows the spray rack to be supported against the building without generally requiring other objects, such as ladders, etc., to support the spray rack regardless of the height of the window relative to the ground. The adjustable nature of the spray rack also allows the spray rack to be easily customized for use with a particular window. The collapsible nature of the spray rack promotes space efficient storage and travel of the spray rack. Accordingly, the various features of the spray rack provide a user-friendly and effective device for testing windows for water penetration.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A spray rack suitable for testing a window in a building, the spray rack comprising:

a plurality of spray bars each including at least one nozzle for spraying fluid;

at least one stand-off leg coupled with the plurality of spray bars and including a plurality of pre-measured settings each corresponding to a distance between the at least one nozzle and the window, wherein the at least one stand-off leg is configured to be set at one of the plurality of pre-measured settings to interface with the building and to position the plurality of spray bars a desired distance from the window for testing the window by spraying the fluid from the at least one nozzle of each of the plurality of spray bars toward the window.

2. The spray rack of claim 1, wherein the desired distance is a distance specified in a standard window water penetration test.

3. The spray rack of claim 1, wherein the at least one nozzle on each of the plurality of spray bars is a plurality of nozzles, and the plurality of nozzles are spaced from each other in accordance with the specifications of a standard window water penetration test.

4. The spray rack of claim 3, wherein the standard window water penetration test is an ASTM E331-00 test, and further wherein the desired distance is a distance specified for the ASTM E331-00 test.

5. The spray rack of claim 1, further comprising:
a cross bar, wherein the at least one stand-off leg is coupled with the plurality of spray bars via the cross bar.

6. The spray rack of claim 5, wherein each of the plurality of spray bars is coupled with the cross bar with a quick coupler.

7. The spray rack of claim 5, further comprising:
a support leg rotatably coupled with the cross bar and configured to interface with a ground to support the spray rack against the building during use.

8. The spray rack of claim 7, wherein the support leg has an adjustable length.

9. The spray rack of claim 5, wherein the at least one stand-off leg is transitionable between a storage position and a stand-off position.

10. The spray rack of claim 1, further comprising:
a plurality of spray bar extensions each including at least one nozzle and being coupled with the plurality of spray bars with a quick coupler.

11. The spray rack of claim 1, further comprising:
a pressure gauge in communication with a liquid passing through the plurality of spray bars, the pressure gauge configured to facilitate monitoring of a pressure of the liquid.

12. The spray rack of claim 1, wherein the liquid is water, and the spray rack further comprises:
a water supply connector coupled with one of the plurality of spray bars, the water supply connector being configured to interface with a water source to supply the water to the spray rack.

13. The spray rack of claim 1, wherein the plurality of spray bars and the at least one stand-off leg are formed of anodized aluminum.

14. A spray rack suitable for testing water penetration through a window on an exterior of a building, the spray rack comprising:
a cross bar including a plurality of first quick coupler portions; and
a plurality of spray bars each including at least one nozzle configured to spray liquid and a second quick coupler portion configured to interface with one of the first quick coupler portions to couple each of the plurality of spray bars to the cross bar and to place each of the plurality of spray bars in fluid communication with the cross bar.

15. The spray rack of claim 14, further comprising:
an adjustable stand-off leg coupled to the cross bar and configured to interact with the exterior of the building to position the at least one nozzle of each of the plurality of spray bars a predetermined distance from the window as specified in a water penetration test.

16. The spray rack of claim 14, further comprising:
an adjustable length support leg configured to be coupled with the cross bar and to support the spray rack against the building.

17. The spray rack of claim 14, in combination with a bag configured to store and transport the cross bar and the plurality of spray bars.

18. A spray rack suitable for testing water penetration through a window on an exterior of a building, the spray rack comprising:
a cross bar including a plurality of first quick coupler portions;
a plurality of spray bars each including at least one nozzle for spraying fluid and a second quick coupler portion configured to interface with one of the first quick coupler portions to couple each of the plurality of spray bars to the cross bar and to each of the plurality of spray bars in fluid communication with the cross bar;
at least one stand-off leg coupled with the plurality of spray bars, the at least one stand-off leg including a plurality of pre-measured settings each corresponding to a distance between the at least one nozzle and the window, wherein the at least one stand-off leg is configured to be set at one of the plurality of pre-measured settings to interface with the building and to position the spray bars a desired distance from the window for testing the window by spraying the fluid from the nozzles toward the window.

19. A method of using a spray rack including a cross bar having a plurality of first quick coupler portions, a plurality of spray bars each including at least one nozzle for spraying a fluid and a second quick coupler portion, and at least one stand-off leg coupled with the cross bar, the method comprising:
coupling each of the plurality of spray bars to the cross bar by interfacing each of the second quick coupler portions of the plurality of spray bars with one of the plurality of first quick coupler portions, wherein coupling each of the plurality of spray bars to the cross bar includes placing each of the plurality of spray bars into fluid communication with the cross bar; and
setting the at least one stand-off leg to a pre-measured setting that is one of a plurality of pre-measured settings defined by the at least one stand-off leg, each of the plurality of pre-measured settings corresponding to a distance between the at least one nozzle and a window.

20. The method of claim 19, further comprising:
interfacing the spray rack with a building including the window;
positioning the spray bars a desired distance from the window; and
testing the window by spraying a fluid from the nozzles toward the window.

21. The method of claim 19, wherein coupling the at least one stand-off leg with the plurality of spray bars includes coupling the at least stand-off leg with the cross bar such that the at least one stand-off leg is coupled with the plurality of spray bars via the cross bar.

22. The method of claim 19, further comprising:
adjusting the length of a support leg coupled with the cross bar to adjust the overall height of the spray rack.

23. The method of claim 19, further comprising:
coupling a spray bar extension including at least one nozzle to at least one of the plurality of spray bars with a quick coupler.

24. The method of claim 19, further comprising:
connecting a fluid supply with one of the plurality of spray bars;
routing fluid from the fluid supply through the cross bar and the plurality of spray bars; and
monitoring the pressure of the fluid routed through the cross bar and the plurality of spray bars with a pressure gage that is in communication with the fluid passing through the plurality of spray bars.

* * * * *